United States Patent [19]

Bondioli

[11] Patent Number: 4,919,244
[45] Date of Patent: Apr. 24, 1990

[54] OIL-BATH MECHANICAL DRIVE BOX WITH INPUT AND OUTPUT SHAFTS AND WITH AUTOMATIC AND/OR DRIVEN DEVICES HOUSED THEREIN AND INSERTED IN THE DRIVE

[76] Inventor: Edi Bondioli, Via Gina Bianchi, 18, 46029 Suzzara, Mantova, Italy

[21] Appl. No.: 231,184

[22] Filed: Aug. 11, 1988

[30] Foreign Application Priority Data

Aug. 13, 1987 [IT] Italy .................. 9458 A/87

[51] Int. Cl.$^5$ ............................................. F16D 43/20
[52] U.S. Cl. .................................. 192/56 R; 74/417; 192/96; 464/39
[58] Field of Search ............... 192/56 R, 96; 464/37, 464/38, 39; 74/417

[56] References Cited

U.S. PATENT DOCUMENTS

| | | | |
|---|---|---|---|
| 521,677 | 6/1894 | Smith | 464/39 X |
| 1,936,665 | 11/1933 | Gauthier | 192/56 R |
| 2,238,583 | 4/1941 | Dodge | 464/37 X |
| 2,514,228 | 7/1950 | Dodge | 464/37 X |
| 2,546,633 | 3/1951 | Dodge | 464/39 X |
| 2,828,845 | 4/1958 | Thornton | 192/96 |
| 3,442,360 | 5/1969 | Fulop | 192/56 R |
| 4,468,206 | 8/1984 | Herchenbach et al. | 464/37 |

FOREIGN PATENT DOCUMENTS

| | | | |
|---|---|---|---|
| 195720 | 2/1938 | Switzerland | 464/39 |
| 871803 | 6/1961 | United Kingdom | 464/38 |
| 945296 | 12/1963 | United Kingdom | 192/96 |
| 1466380 | 3/1977 | United Kingdom | 192/56 R |

Primary Examiner—Allan D. Herrmann
Attorney, Agent, or Firm—McGlew & Tuttle

[57] ABSTRACT

A mechanical drive box (8) comprising at least a shaft (1; 3) and at least a drive member (10) on the shaft and for the transmission of the motion between the shaft and the drive member, a device for the transmission of motion comprising: a set of pawls (26) radially movable within seats (16) formed in the shaft (1), said pawls having internal and external ends (26A) shaped in radial and/or axial direction; inside said drive member, a housing (20) wherein a drive member is received having a shaped surface for cooperating with the external ends of said pawls; inside the shaft, an axial cavity (14) for housing a shaped core (30) axially movable for the operation, with elastic means (36) for reacting to the axial movement of said core; and on said core, shapings and inclined surfaces (40, 42) able to cooperate with the internal shaped ends of the pawls; the axial position of said core and/or the force of the elastic means acting on the core determine the radial position of said pawls and/or their resistance against a centripetal movement thereof.

13 Claims, 16 Drawing Sheets

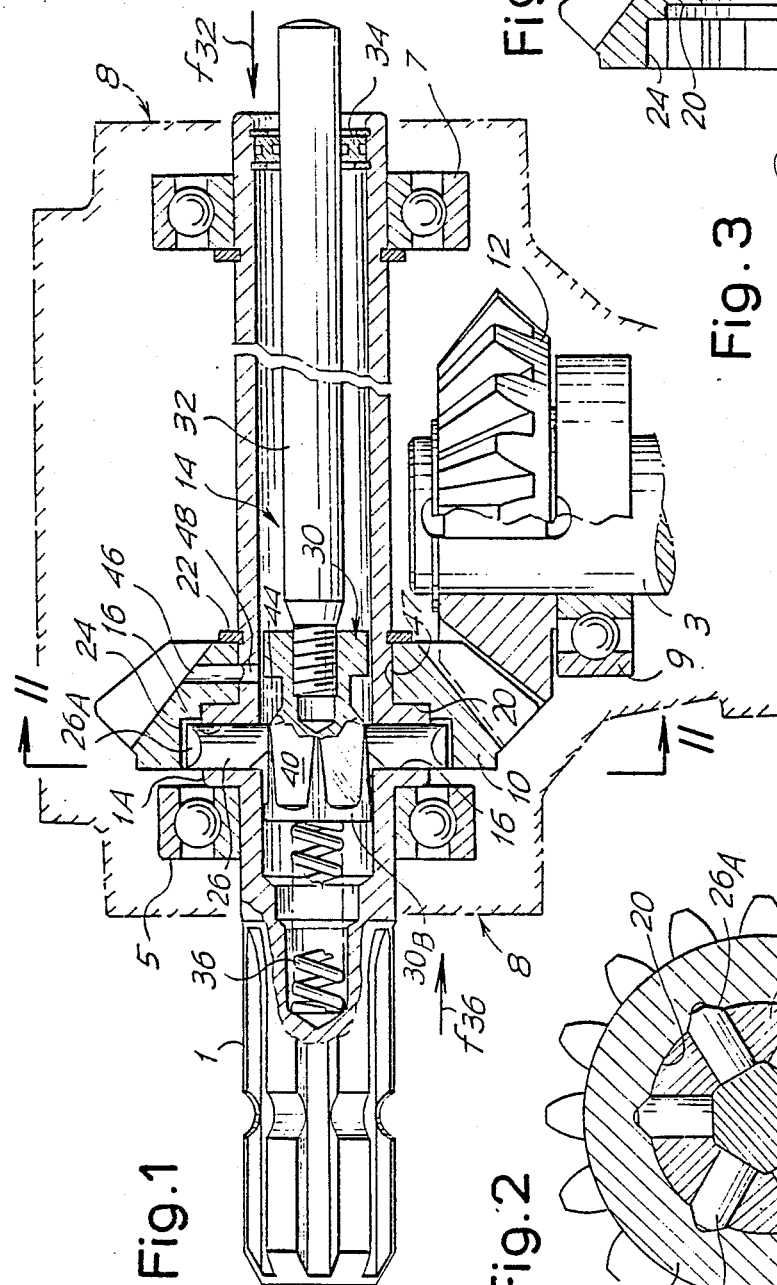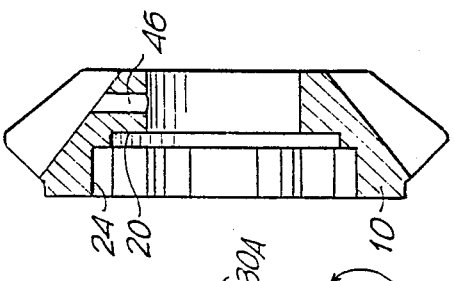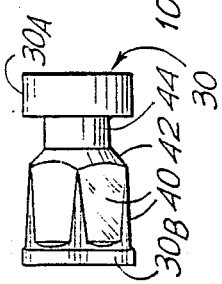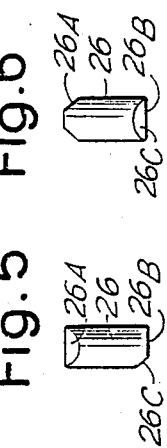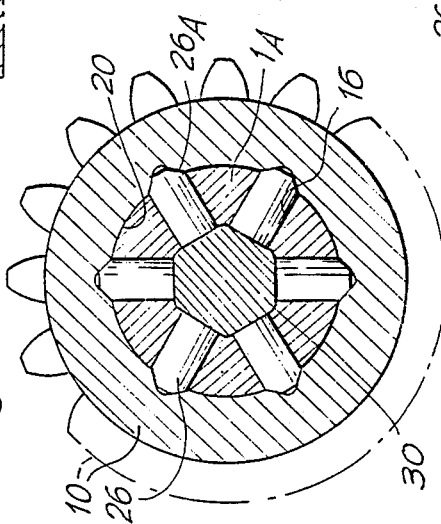

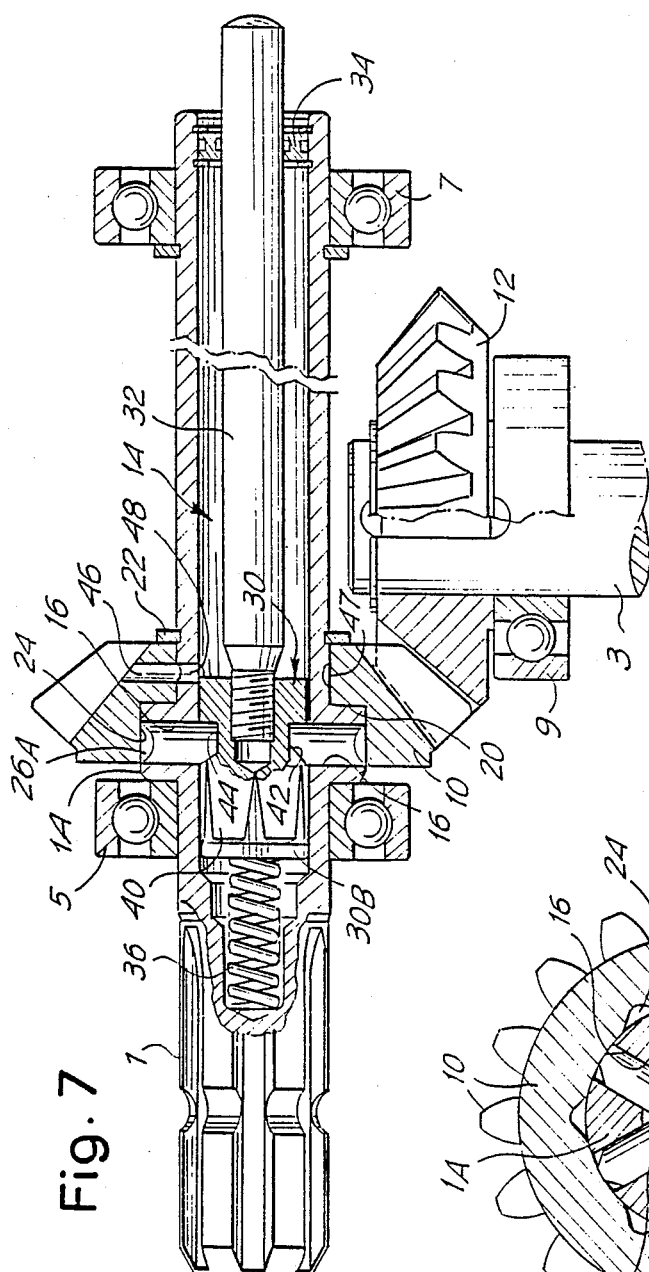
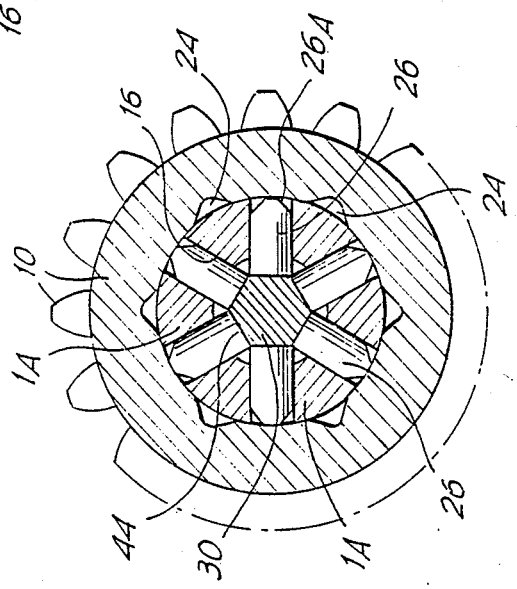
Fig. 7
Fig. 8

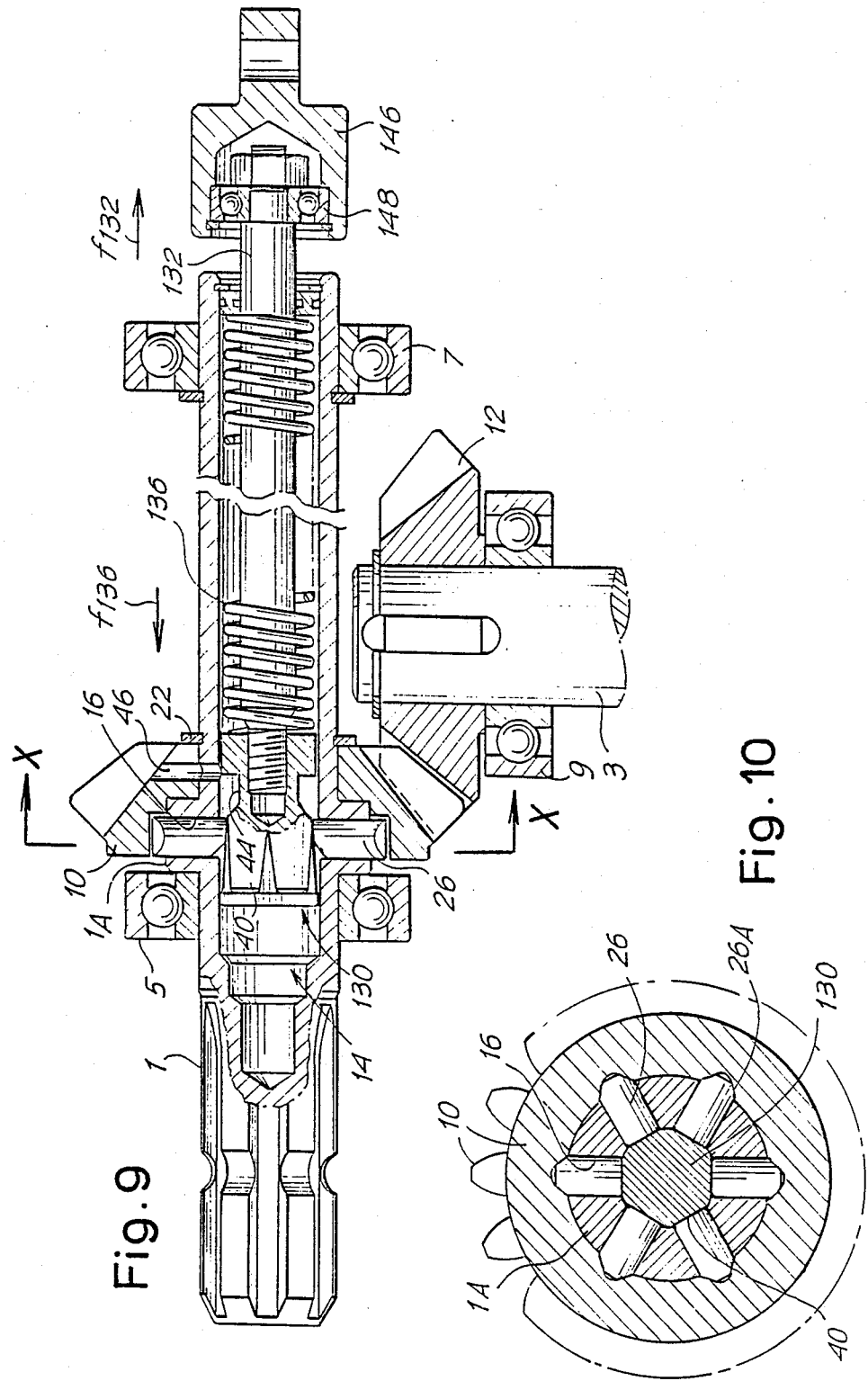

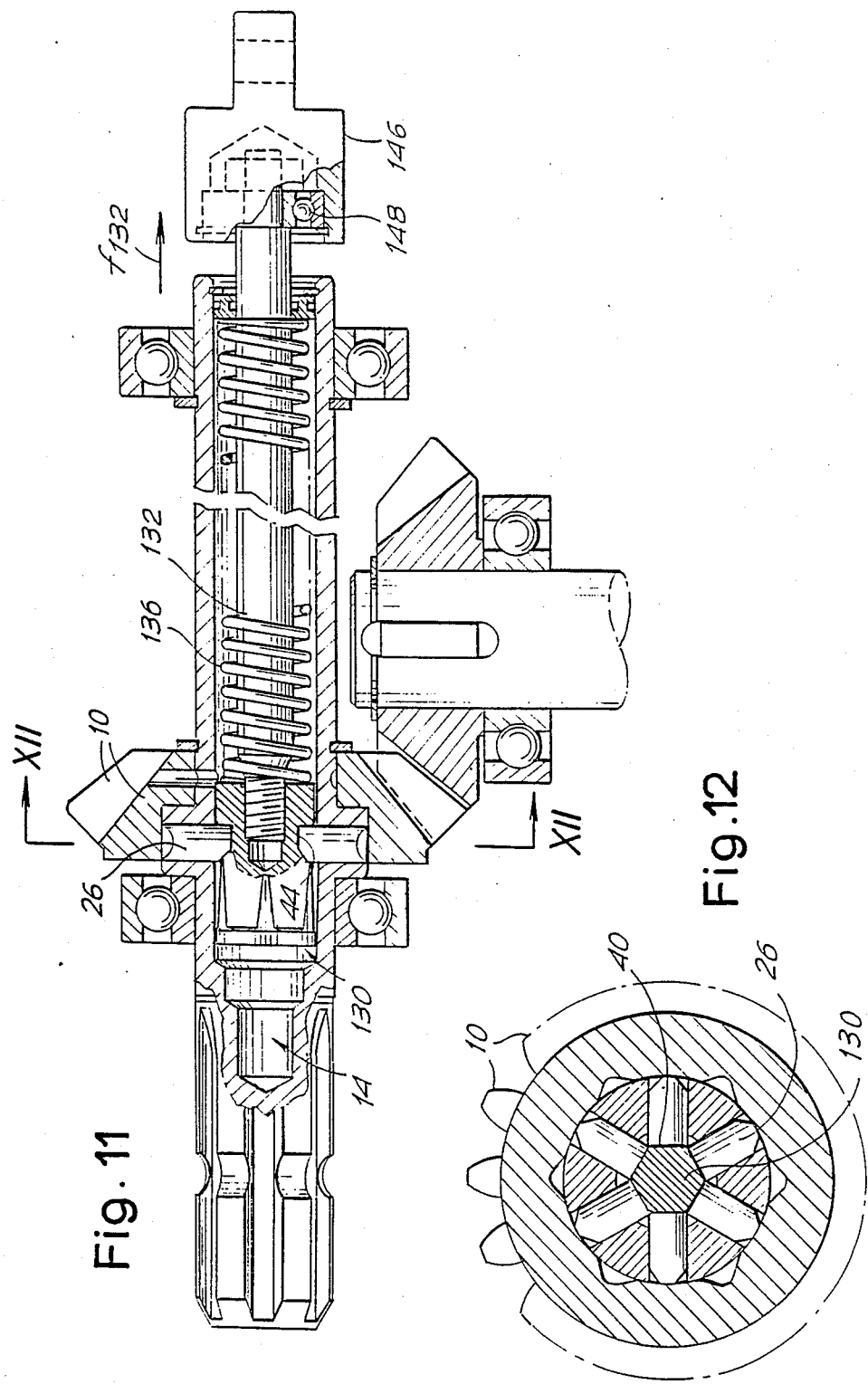

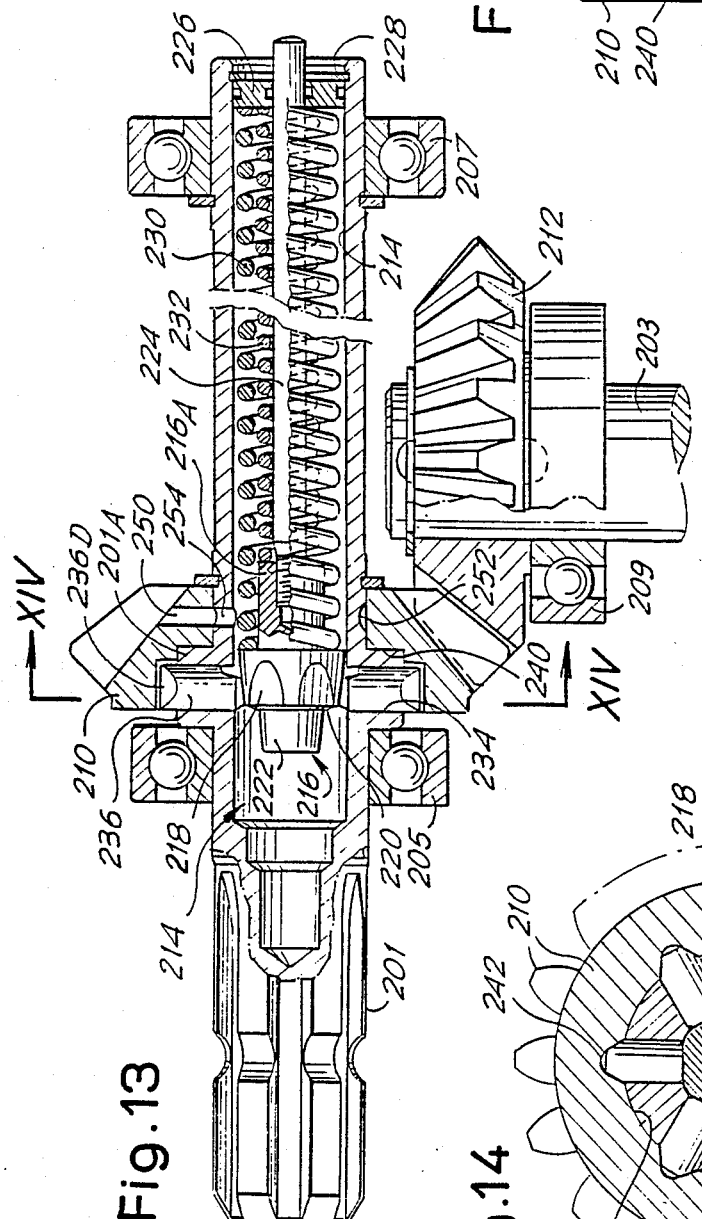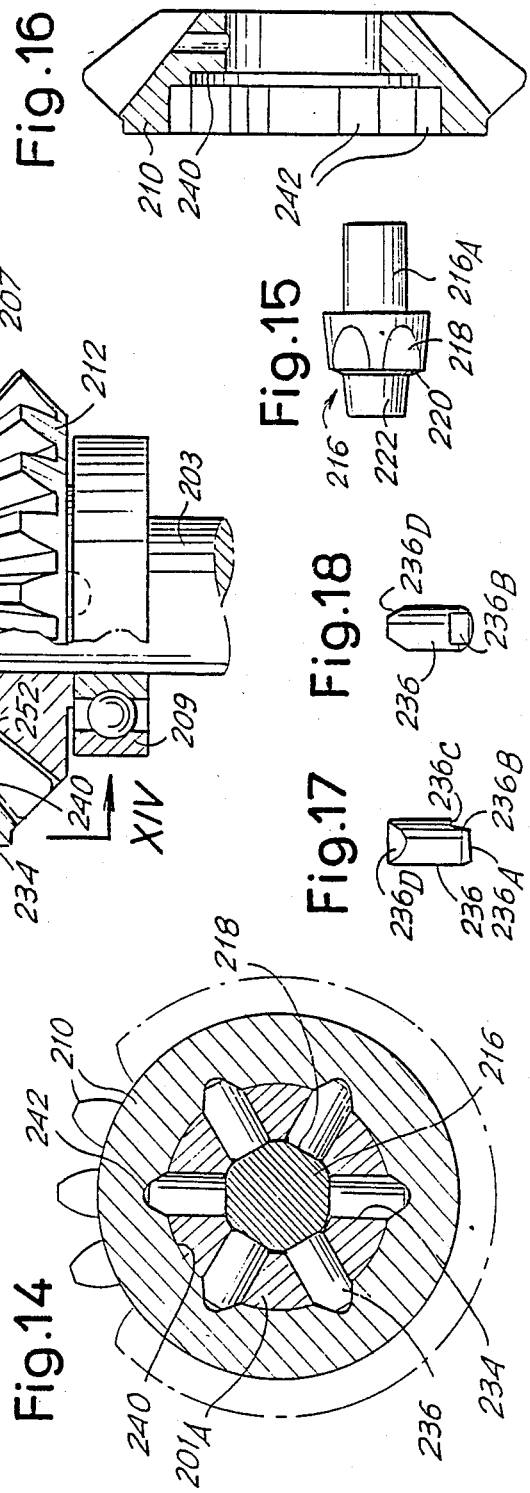

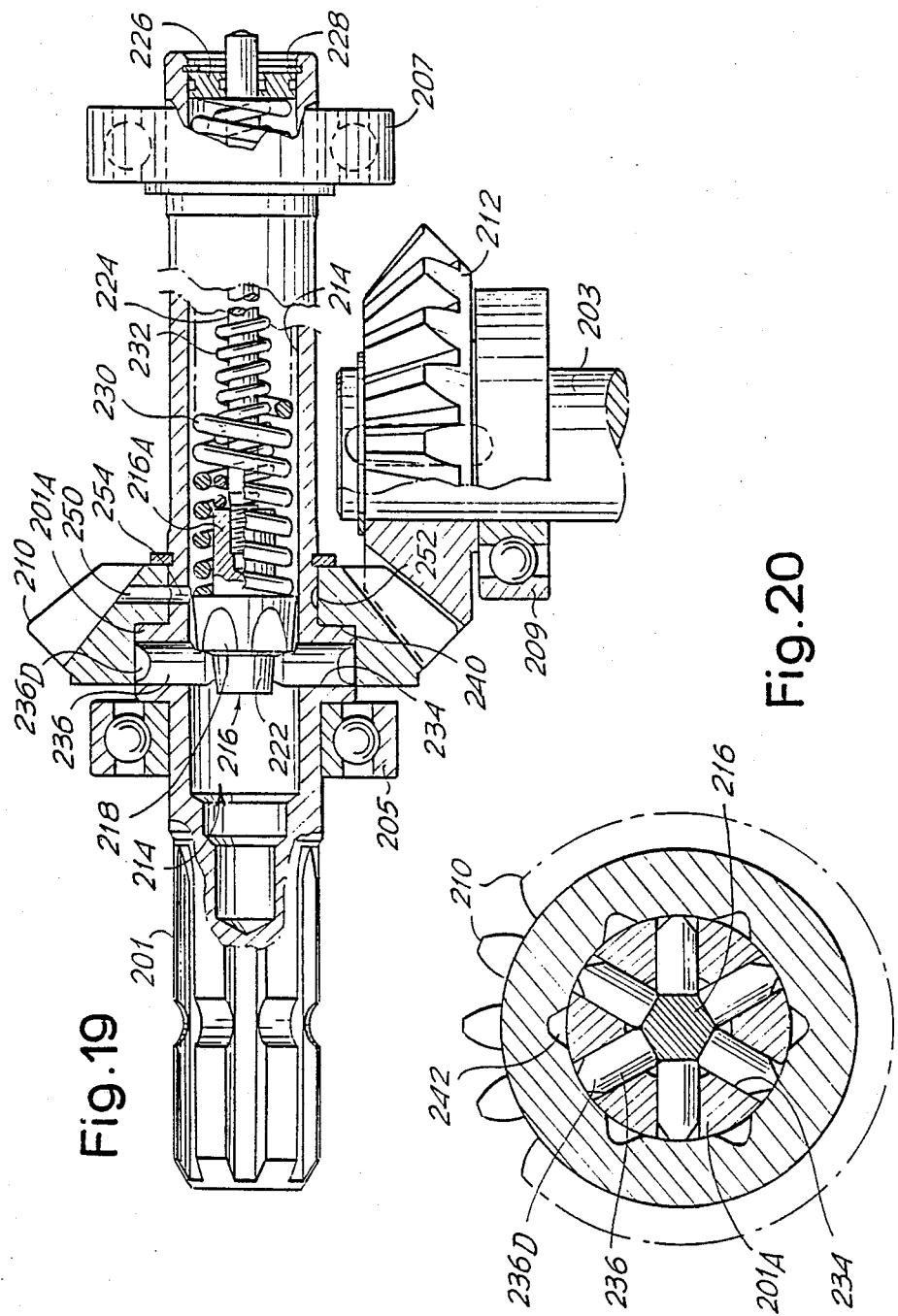

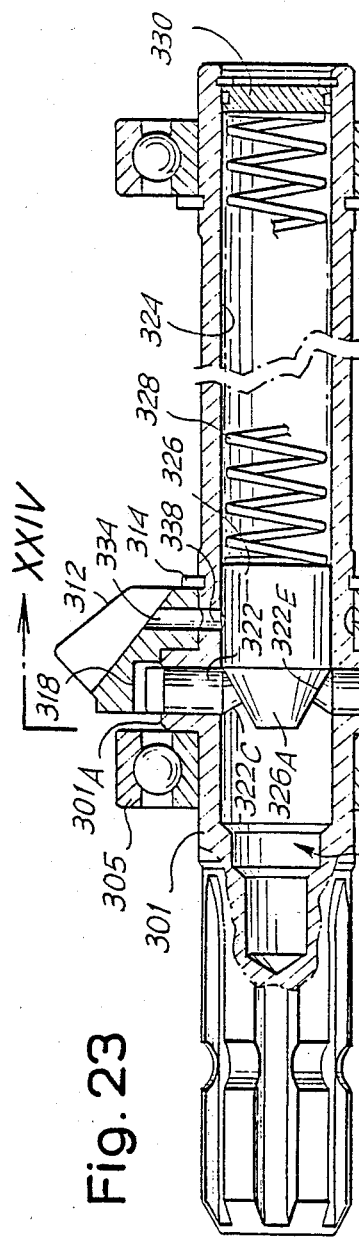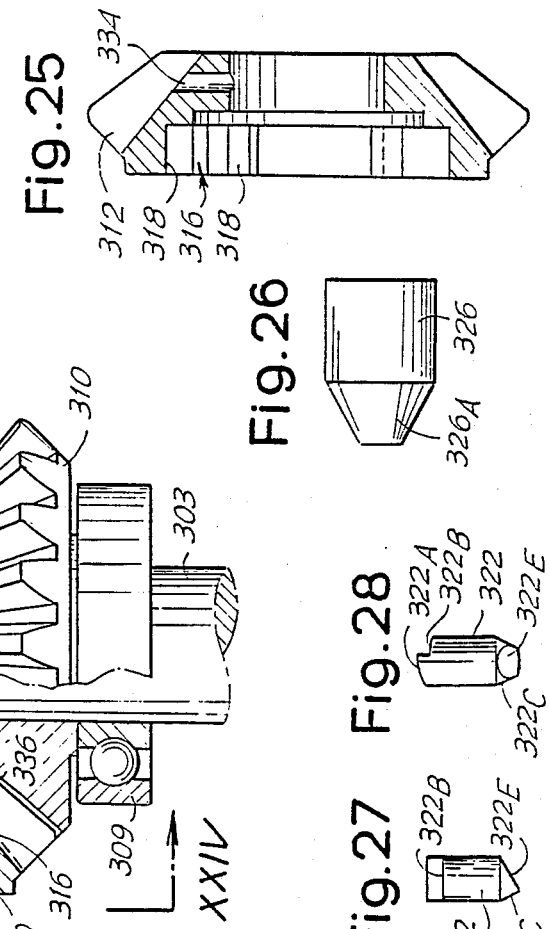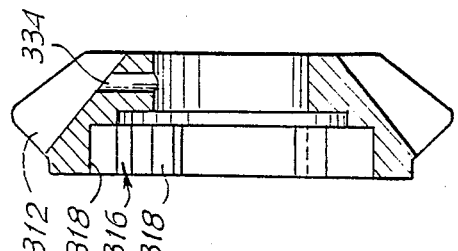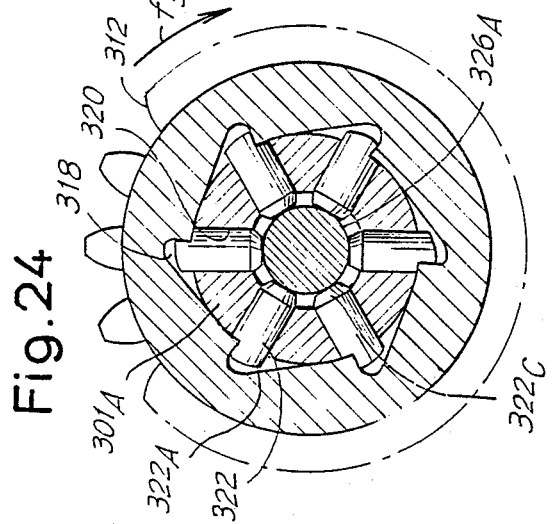

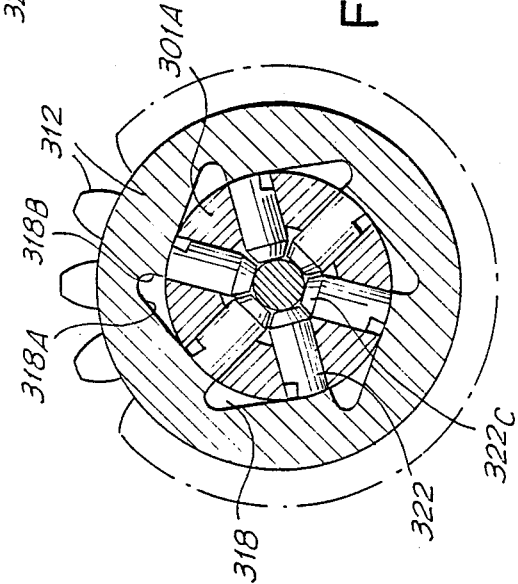

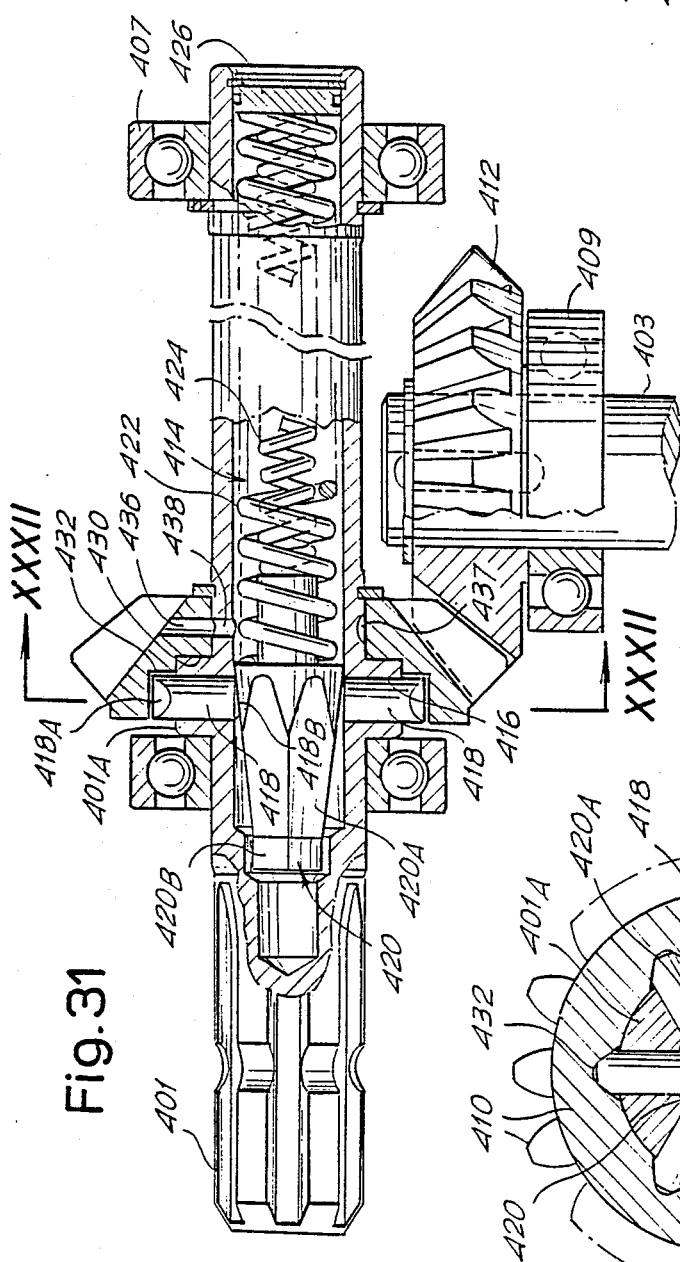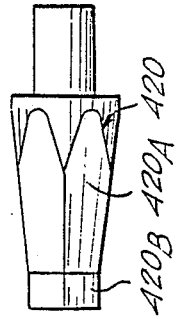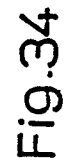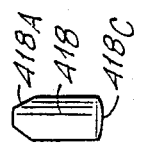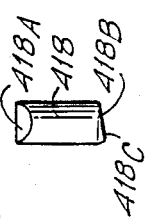

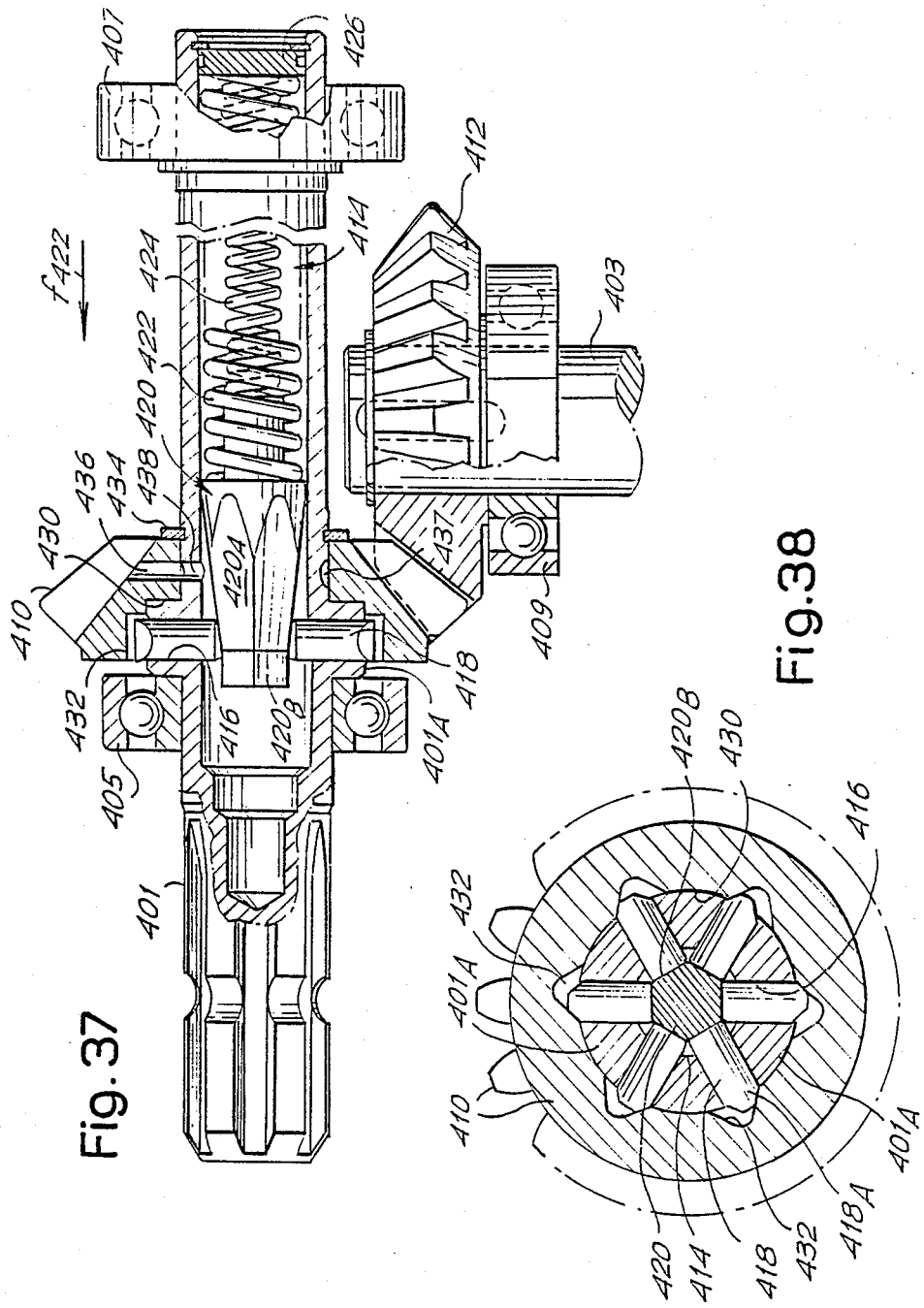

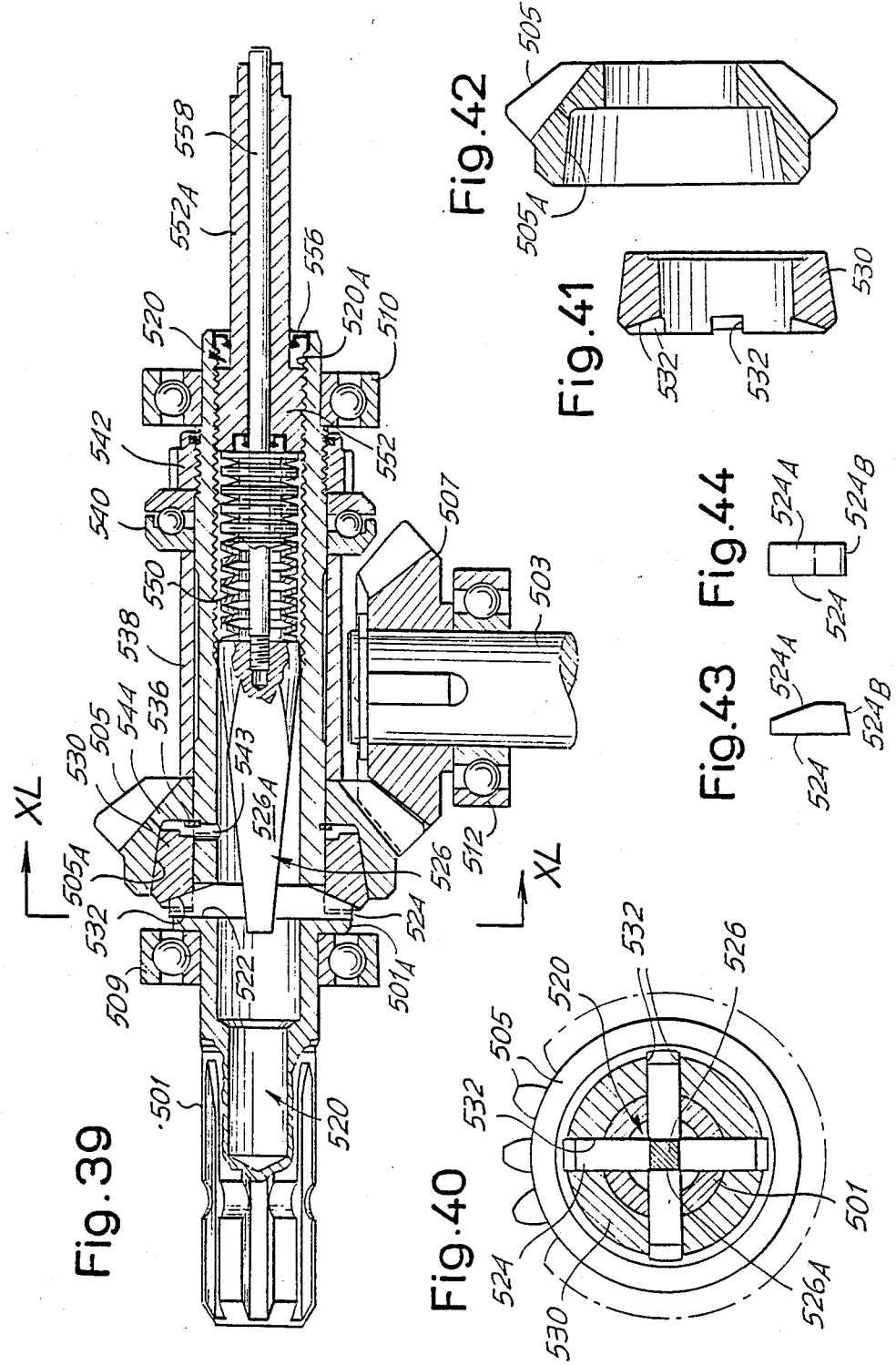

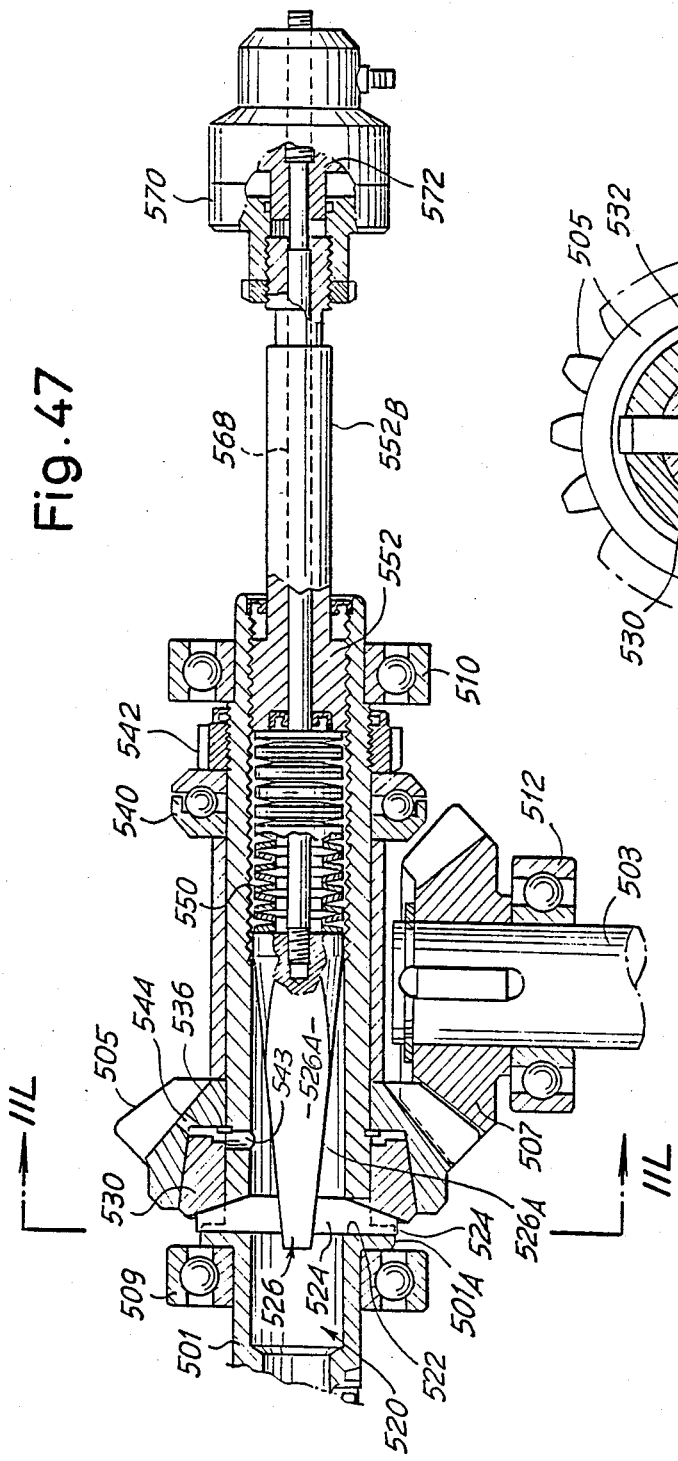
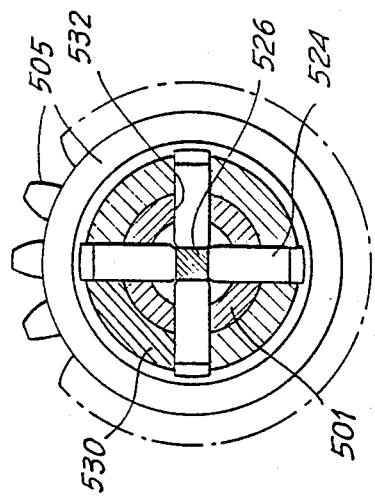
Fig. 47
Fig. 48

OIL-BATH MECHANICAL DRIVE BOX WITH INPUT AND OUTPUT SHAFTS AND WITH AUTOMATIC AND/OR DRIVEN DEVICES HOUSED THEREIN AND INSERTED IN THE DRIVE

FIELD OF THE INVENTION

The invention relates to oil-bath drive boxes, with input and output shafts. Boxes of this type are currently used in various applications such as agricultural and industrial machines and in fixed and mobile installations. They usually allow only simple gear drives, with cylindrical or conical gears, between parallel or angled shafts.

BACKGROUND OF THE INVENTION

The drives on which the above mentioned boxes are used, require often further devices - such as engagement and disengagement devices torque limiting devices unidirectional couplings (i.e. freewheels), flexible couplings, spontaneous or driven slip clutches, and other - which are usually autonomously inserted within the drive. This brings about significant overall dimensions, construction complications (for the need to protect the device elements inside their own seal case) and application problems, possibility of increased risks with respect to the personnel safety, higher costs and other drawback which are evident to those skilled in the art.

SUMMARY AND OBJECT OF THE INVENTION

The object of the invention is to eliminate these drawbacks.

Substantially, a mechanical drive box according to the invention - having at least a shaft and at least a drive member on the shaft, and a device for the transmission of motion between the shaft and the drive member - is provided in such a way that said device, for the transmission of motion between said shaft and the member mounted thereon, comprises:

a set of pawls radially movable within seats formed in the shaft and on a possible element solid thereto to ensure the pawls guide, said pawls having internal and external ends shaped in radial and/or axial direction;

inside said drive member, a housing;

inside said housing, a drive member having a shaped surface for cooperating with the external ends of said pawls;

inside the shaft, an axial cavity for receiving a shaped and axially movable core for the operation, with elastic means reacting to the axial movement of said core; and on said core, shapings and inclined surfaces able to cooperate with the internal shaped ends of the pawls;

the axial position of said core and/or the force of the elastic means acting on the core, determining the radial position of said pawls and/or their resistance against a centripetal movement thereof.

In said drive member a housing may be formed in correspondence of the pawls, and in said housing shaped seats are then perimetrally formed to cooperate with the external shaped ends of the pawls.

A mechanical drive box according to the invention may comprise at least two shafts - an input shaft and an output shaft - and at least a gear drive member on one of said shafts; the housing for receiving, at least partially, the device with pawls may thus be formed in the body of said gear. When the gear is a bevel gear, the housing is advantageously formed in the larger part of its body.

To ensure the lubrication of the core and of the pawls, radial passages may be provided between the teeth of the gear and as far as the axial cavity of the shaft, with a manifold provided in the cooperating surfaces of said member and shaft.

The spring means may be held within the cavity and made to rest on a retaining and supporting disc, said ring or disc being possibly provided with means for the retention of lubricating oil.

A mechanical drive box with input and output shafts and with gears thereon may be provided in the body of each of these gears with a different device having relevant pawls and a relevant core.

Each of the above mentioned devices may be, for example, a disengaging device and/or a clutch or other, with axial control inside the shaft, respectively, a torque limiting device, or a flexible coupling or other.

BRIEF DESCRIPTION OF THE DRAWINGS

The invention will be better understood by following the description and the attached drawing, which shows practical, non limitative exemplifications of the same invention. In the drawing:

FIG. 1 shows in an explanatory way a sectional view of a drive box, with a disengaging device included therein in the engaged condition or arrangement;

FIG. 2 is a section on line II—II of FIG. 1;

FIGS. 3 and 4 show separately two members of the device, and in particular, a core and the gear wherein the device is partially housed;

FIGS. 5 and 6 show separately and in two views a pawl used in the device in question;

FIGS. 7 and 8 are similar to FIGS. 1 and 2, but show the device in the disengaged arrangement;

FIGS. 9, 10, 11 and 12 show a modified embodiment in a longitudinal section and in a cross section on line X—X of FIG. 9, and in the engaged and disengaged arrangement, respectively;

FIGS. 13 and 14 show, in longitudinal section and in section on line XIV—XIV of FIG. 13, a torque-limiting device incorporated in the drive members of the box, in the engaged condition or arrangement;

FIGS. 15 and 16 show two device components;

FIGS. 17 and 18 show two views of a pawl making part of the device;

FIGS. 19 and 20 are similar to FIGS. 13 and 14, but show the device in disengaged condition or arrangement;

FIGS. 23 and 24 show, in longitudinal section and in cross section on line XXIV—XXIV of FIG. 23, a freewheel device incorporated in a drive box and in engaged condition;

FIGS. 25 and 26 show two device components;

FIGS. 27 and 28 show two views of a pawl making part of the device;

FIGS. 29 and 30 show the device similarly to FIGS. 23 and 24, but in disengaged condition;

FIGS. 31 and 32 show, in longitudinal section and in cross section on line XXXII—XXXII of FIG. 31, a flexible coupling device incorporated in the drive box in question;

FIGS. 33 and 34 show separately two components of the device;

FIGS. 35 and 36 show separately a pawl in two side opposite views;

FIGS. 37 and 38 show similarly to FIGS. 31 and 32 the device in the condition in which the elastic yielding has already taken place;

FIGS. 39 and 40 show, in longitudinal section and in cross section on line XL—XL of FIG. 39, a clutch device incorporated in the box, in a condition in which the wear process of the surfaces in friction contact is in its initial stage;

FIGS. 41 and 42 show separately two components of the clutch device;

FIGS. 43 and 44 show separately and in two views, a pawl of said device;

FIGS. 47 and 48 show, in longitudinal section and in cross section on line XLVIII—XLVIII of FIG. 47, a modified embodiment of the clutch device;

DESCRIPTION OF THE PREFERRED EMBODIMENTS

Figure 21:
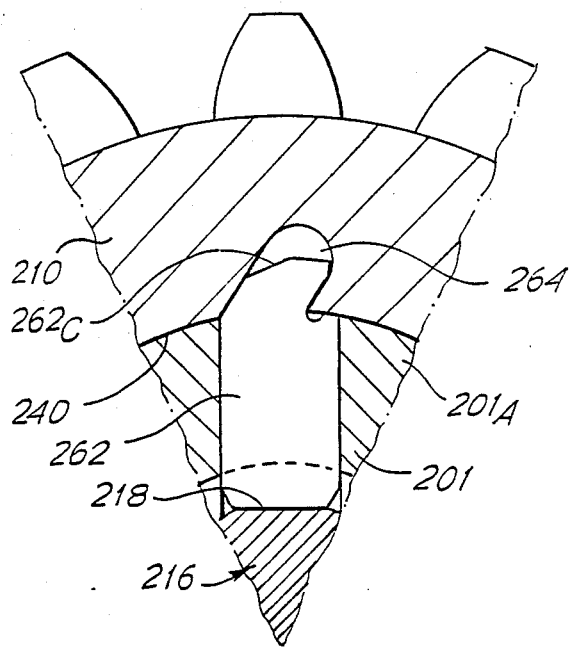
FIGS. 21 and 22 show a modified embodiment of pawls and of members making up the seats for said pawls.

According to what is illustrated in FIGS. 1 to 8, numeral 1 indicates one of the shafts of the drive and numeral 3 indicates the other shaft orthogonal to the previous one. Numerals 5 and 7 indicate the bearings which support the shaft 1 within a drive box 8. Numeral 9 indicates one of the bearings which supports the shaft 3. Numerals 10 and 12 indicate the two bevel gears that are mounted on shaft 1 and on shaft 3, respectively, for the transmission between said two shafts. Gear 12 is keyed on shaft 3, while gear 10 is coupled to shaft 1 through the illustrated disengaging device. Shaft 1 has a deep axial cavity 14 which is tapered towards the left end (looking at FIG. 1), and from which a plurality of radial seats 16, formed within an annular expansion 1A of shaft 1, branch off. This annular expansion 1A is at least partially received into a housing 20 formed in the wider part of the core of gear 10, that is, in correspondence of the major base of said frustoconical core of the gear 10. Said the gear 10 is engaged between the expansion 1A and a retaining ring 22 with limited play allowing the possibility for a relative rotation with respect to the shaft. Expansion 1A is in abutment against bearing 5. Housing 20 exhibits a right angles profile in its diametral cross section and has a substantially cylindrical perimetral wall, wherein a plurality of seats 24 with at least an inclined profile are formed. In FIG. 1 seats 24 are shown which are substantially symmetrical with respect to the corresponding pitch diameter. The number of seats 24 corresponds at least to the number of radial seats 16 within the annular expansion 1A of shaft 1, all seats being symmetrically distributed. Within seats 16, radially sliding pawls 26 are housed, which are shaped at their outer end 26A with a shaping corresponding to that of seats 24 with which they must cooperate. The pawls inner ends are shaped with two inclined planes 26B and 26C, plane 26B being less inclined than plane 26C with respect to the shaft axis.

Inside the axial cavity 14 of shaft 1, a core 30 is movable with which an axial control rod 32 is connected control rod 32 projects beyond the end of shaft 1 by going through a seal disc 34 preventing leakage of lubricant. The seal disc 34 is held by elastic retaining rings. Core 30 is urged by a helical spring 36, reacting on the bottom of cavity 14 of shaft 1, in the direction of arrow f36, that is, in such a direction as to cause the control rod 32 to come out from disc 34. Core 30 has overall cylindrical dimensions delimited by the two cylindrical end zones 30A and 30B, which allow a correct sliding of the core inside the axial cavity 14, that is also cylindrical at least in the zone where said core must slide. In the vicinity of the cylindrical zone 30B the core further exhibits a portion with a conical shaping or with flats 40 inclined with respect to the core axis to an extent corresponding to that of the pawls surfaces 26B having less inclination. This portion is followed by a zone 42 which may be frustoconical or have flats lined up with those indicated by 40 but having greater inclination with respect to the core axis, corresponding to the inclination of surfaces 26C of pawls 26. Between the zone 30A and the portion 42, an annular groove 44 is thereby created having such a width as to be able to house the inner ends of the pawls. Advantageously, the lower inclination of surfaces 26B and surfaces 40 may correspond to the inclination of the cone or angle of friction between surfaces 26B and 40 in the lubrication conditions provided inside cavity 14 for the purposes to be indicated. The lubrication inside cavity 14 and thus inside the disengaging device is ensured through the motion of gear 10, by the presence of radial holes 46 in correspondence of the slot between adjacent teeth of gear 10, through an annular manifold 47 and corresponding holes 48 suitably distributed in the thickness of shaft 1 between the outside and cavity 14, over the core sliding zone. Through the rotation of gears 10 and 12 meshing with each other in an oil bath inside the box where the bearings 5, 7 and 9 are mounted, it is possible to make the lubricant enter inside cavity 14 to lubricate all the cooperating surfaces of core 30 and of pawls 26.

According to a possible modified embodiment, the core 30 may exhibit, in place of surfaces 40, a frustoconical or a cylindrical surface, or even a prismatic configuration.

The operation of the disengaging device according to the above description is as follows. Under the transmission conditions, the thrust exerted by spring 36 causes a displacement of core 30 to a position in which pawls 26 interact with the corresponding surfaces 40. Pawls 26 protrude from the expansion 1A of shaft 1 and penetrate, with their shaped ends 26A, into seats 24 formed by the cavity 20 of the body of gear 10. The transmission of motion takes place through the reaction between the walls of seats 24 and the shaped ends 26A of pawls 26. During the motion transmission pawls 26 are pressed in the centripetal direction against the surfaces 40 of core 30 according to an extent depending on the transmitted torque. When the inclination angle of surfaces 40 and of surfaces 26B has a value which is nearly that of the angle of friction occurring under the working conditions of such surfaces, as far as the sliding possibility of core 30 is concerned, the operation results, considerably independent of the transmitted torque, inasmuch as independent of the pressures exerted by the pawls 26 upon surfaces 40. Under normal drive condition, the thrust of spring 36 is sufficient to keep the core in the position wherein the surfaces 40 thereof cooperate with the surfaces 26B of pawls 26. The rod 32 projects from disc 34 and from the shaft, as well as from the box in which shaft 1 is mounted. When it is desired to disengage the device in order to break off the transmission between the two gears 10 and 12, it is sufficient to push rod 32 in the direction of arrow f32 so that (without a differentiated effort being required in compliance with the transmitted torque) core 30 may be moved thereby causing the pawls to move inside the annular groove 44 and come into contact with the pawls surfaces 26C having greater inclination and with the surface 42 of groove 44. Under these conditions, the outer end 26A of pawls 26 goes back into the relevant seat 16, and gear 10 becomes disengaged from the coupling with the shaft 1 thereby taking up a disengagement condition. With the stopping of the thrust according to arrow f32 on rod 32, spring 36 urges the pawls through the surfaces 42 and 26C to expand in centrifugal direction so that same pawls penetrate again into the seats 24 with a limited relative angular movement between gear 10 and shaft 1, especially at the moment in which the displacement is made to begin and, however, when the seats 24 are in front of the pawls.

The configuration of the inner ends of pawls and of core 30 allows to obtain a manoeuvre to be made through a very short run of the central core. The manoeuvre is interrupted by the penetration of pawls 26 into groove 44, owing to the presence of the stop provided by the central core on one side of said groove 44.

Spring 36, which acts axially on the core, gives stability to the device in its condition of motion transmission and counteracts (by a force predetermined through the calibration of spring 36) the disengagement manoeuvre by rendering such manoeuvre "sensitive" and allows as well the automatic reactivation of the engagement device as soon as the external thrust on control rod 32 has stopped.

The disengaging manoeuvre, obtained by the thrust according to arrow f32 on the control rod 32, must be broken off only after stopping or greatly slowing down the velocity of all the moving parts.

The device has very limited overall dimensions, so that it can be held in the same drive box provided for the transmission between shafts 1 and 3 as in the traditional transmissions.

In the embodiment shown in FIGS. 9 to 12, the members corresponding to those already described are indicated by the same references. The disposition is reversed as far as the elastic action on core 130 is concerned, the latter being urged by a spring 136 in the direction of arrow f136, that is, in the direction opposite to that indicated by f36 along which the spring 36 of the preceding embodiment is made to operate. Rod 132 is no longer driven in the direction of arrow f32 but in the direction of arrow f132 that is through a tensile action, and for this purpose, a control member 146 is provided, which is combined with rod 132 through a rolling bearing 148 in such a way that, by maintaining the tensile action on member 146 according to arrow f132, the action of spring 136 is won and the engagement condition of the device with pawls 26 coupled to gear 10 is obtained. By stopping the tensile action on the control member 146, the action of spring 136 is allowed, which causes the core 130 to be pushed so as to present the groove 44 in correspondence of the pawls which are centripetally pushed by the profiles of seats 24 for the disengagement. The engagement takes place by exerting a pull on member 146 sufficient to bring back the pawls, through the inclined surfaces 42 and 26C with a centrifugal motion, as far as to fit into seats 24 in order to give rise again to the motion transmission. Also in this case the limited inclination of surfaces 40, to an extent corresponding to the angle of friction, allows rod 132 and spring 136 to be operated without any particular dependence of the transmitted load and thus of the pawls pressure upon core 30.

Spring 136 is made to abut on same disc 34 as already provided in the previously disclosed arrangement, which disc in this case has both the function of providing a seal for the lubricant and a reaction support for spring 136.

FIGS. 13 to 20 show an embodiment of a torque limiting device combined with a gear drive inside a drive box.

Numerals 201 and 203 indicate two shafts, orthogonal to one another, between which the motion must be transmitted through the above mentioned torque limiting device. Numerals 205 and 207 indicate the bearings for the assembling of shaft 201, while numeral 209 indicates one of the bearings of shaft 203. The mechanical transmission between said two shafts takes place by means of a pair of bevel gears 210 and 212. A torque limiting device is predisposed between gear 210 and shaft 201.

In the shaft 201 an axial cavity 214 is formed, starting from the right end of the shaft, looking at FIG. 13. In said cavity 214 a core 216 is inserted, which core is shaped with a plurality of uniformly distributed, inclined surfaces 218. Beyond the edge of each surface 218 which is closer to the core axis, a surface 220 - especially a conical surface - is provided, heavily inclined with respect to the core axis, followed by an extension 222 having a cross-section corresponding to the one on zones 218, or having a frustoconical shape, at the most. In any case, the predetermined, relative angular position of core 216 must be maintained. To the core 216 a coaxial rod 224 is engaged, extending up to the outside of cavity 214. This rod 224 is screwed on a cylindrical extension 216A having reduced cross-section and being opposite to the extension 222. Rod 224 goes through a disc 226 which is engaged through an elastic expansion ring 228 with the internal wall of cavity 214, towards the open end of this cavity. Around rod 224 spring means are provided in the form of two helical springs 230 and 232 (in the drawing) which rest on core 216, 216A and on disc 226 for exerting a compression through a thrust that can be set according to the maximum torque transmittable by means of the device. The setting of this maximum torque can be achieved by replacing either or both springs and also by interposing shims of suitable sizes between the spring(s) and disc 226.

In correspondence of the position which is taken up by core 216 during the operation, a plurality of radial seats 234 are formed within an annular expansion 201A of shaft 201 for slidingly receiving a corresponding number of radial pawls 236 each of which corresponds to a surface 218. The inner ends of pawls 236 have a surface 236A inclined like the surfaces 218, another surface 236B inclined like the surface 220 and a third surface 236C forming a step or Z profile portion. The outer end of each pawl is shaped with a suitable, symmetric or non symmetric profile 236D. In the wider part of its frustoconical portion, the body of gear 210, exibits a housing 240 with a cylindrical coaxial wall, wherein seats 242 are formed having side profiles inclined symmetrically and in correspondence to the shaping 236D of the outer ends of pawls 236. In the housing 240 the annular expansion 201A of shaft 201 is partially received, while pawls 236, being in a centrifugally displaced arrangement within the radial perimetral seats 234, are received into seats 242.

In the normal operating arrangement, the core 216 urged by springs 230, 232 comes into contact through its surfaces 218, with the surfaces 236A of pawls 236, thereby causing them to take the centrifugally displaced position with the ends 236D within the seats 242. Under these conditions, the torque is transmitted between shaft 201 and gear 210, one of these two members being the driving member and the other the driven one. Thus, the balance is maintained between the radial thrust transmitted by the inclined surfaces of seats 242 and ends 236D, and the thrust transmitted by the elastic means 230, 232 through the core and the inclined surfaces 218, 236A. When the transmitted torque increases, the thrust in the centripetal direction by seats 242 on pawls 236 increases as well as far as to axially displace the core 216 against the action of the calibrated springs 230, 232, which occurs at the moment the maximum torque, according to which the elastic thrust has been preset, is exceeded. At this point, after the progressive sliding between surfaces 218 and 236A, a condition is reached in which the surfaces 236B of the pawls inner ends come into contact with the core surface 220 through a fast descent of the pawls in centripetal direction along the zone of surface 220. The transmission of motion is thus interrupted owing to the return of the pawls inside the surface defined by wall 240. Owing to the strong inclination of surfaces 220 and 236B which cooperate together after the disengagement, a very little active trend is generated for the pawls 236 to fit again into seats 242. Only upon slow running conditions, with low relative speed between the shaft and the gear, the slight thrust transmitted by the core to the pawls, in conjunction with the configuration of the outer ends of such pawls, makes it possible to again achieve the engagement condition. In practice, the re-engagement takes place only at slow running.

Rod 224 has the function of providing information about the instantaneous engaged or disengaged condition of the device through the position taken up by the outer end of same rod. It is thus possible to obtain a warning signal or a command by gathering a message from the rod displacement. This message may also imply a warning before the disengagement.

The guiding of body 216 may be ensured by a suitable conformation of the same body to cooperate with the surface of hole 214 (instead by the intervention of the rod).

The lubricant is made to enter the cavity 214 through holes 250 in the gear body, an annular manifold 252 in the shaft and radial holes 254 between the manifold and same cavity 214.

Figure 22:
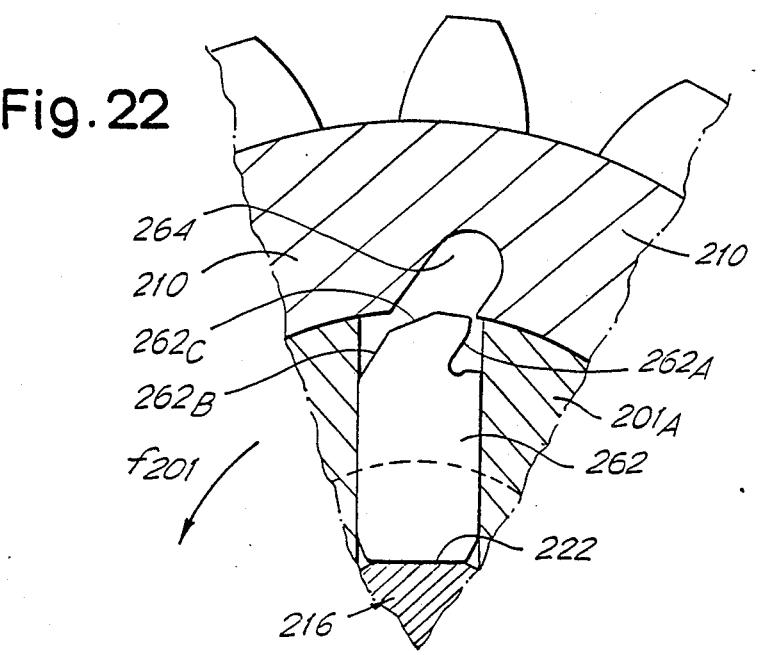
Figure 45:
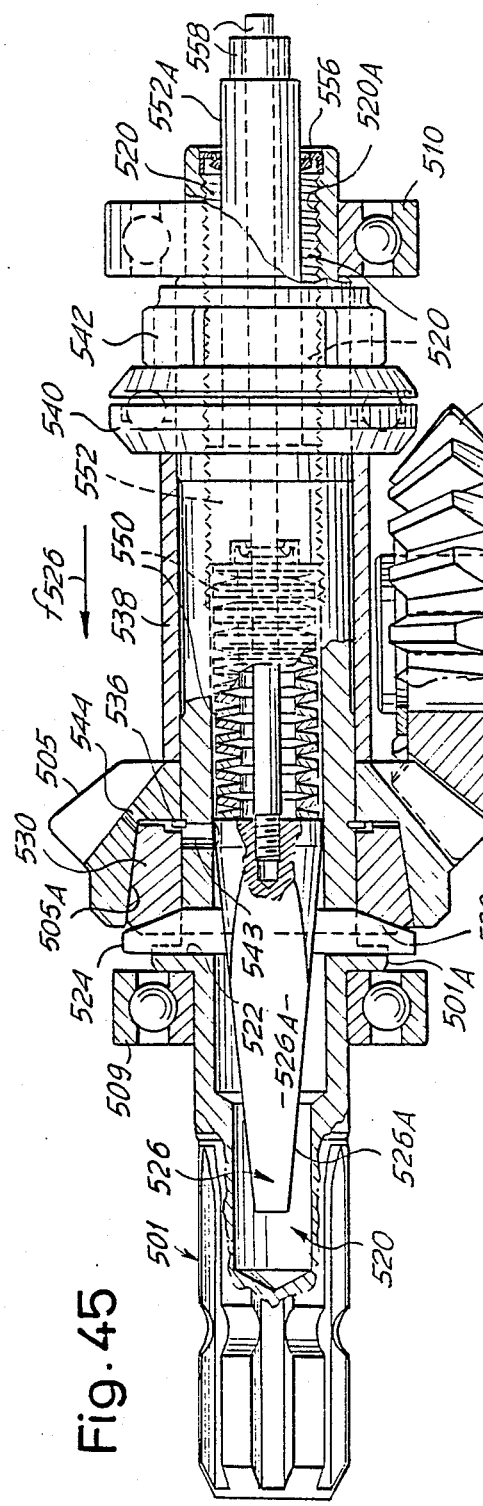
FIGS. 45 and 46 are similar to FIGS. 39 and 40, but show the various members in a different wear condition.
Figure 46:
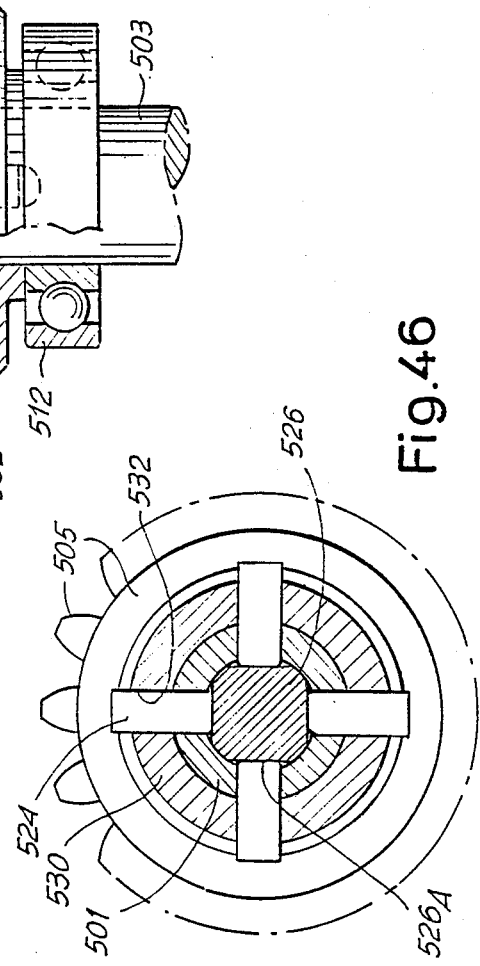
Figure 49:
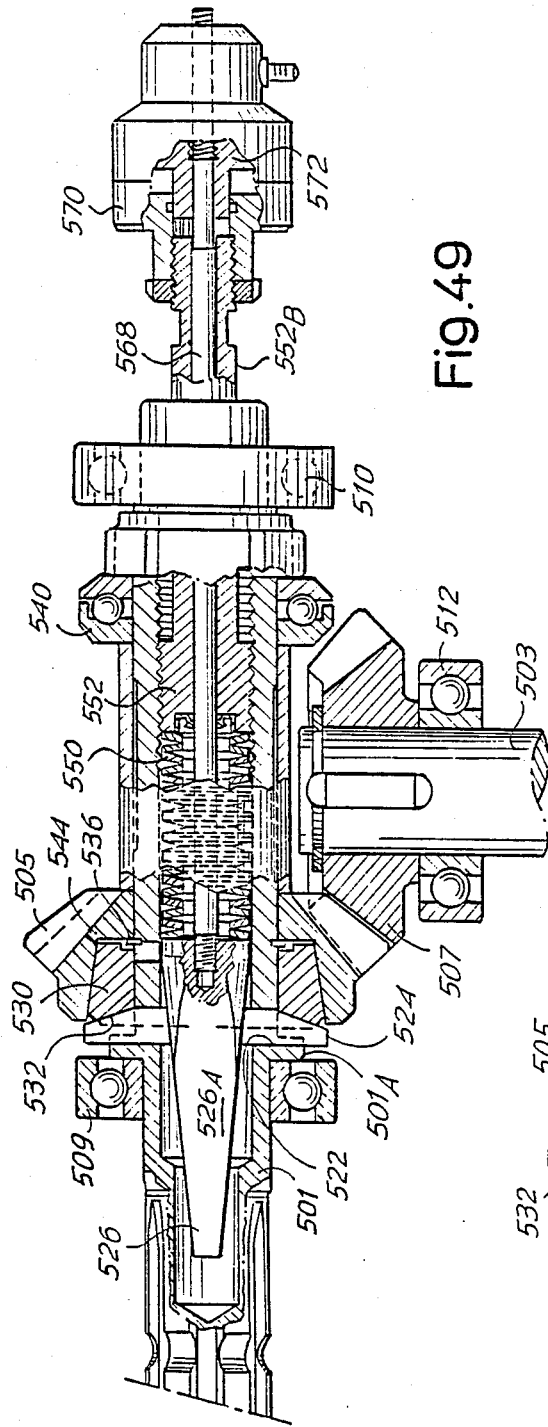
FIGS. 49 and 50 are similar to FIGS. 47 and 48, but show the device in another wear condition.
Figure 50:
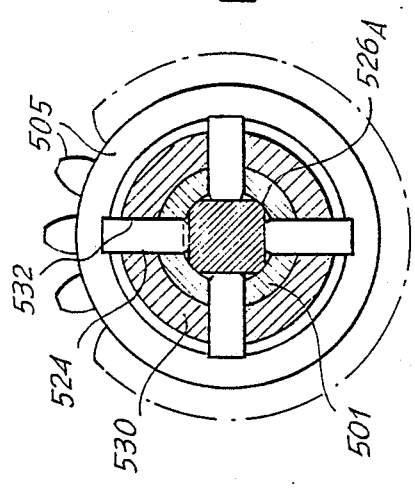

In the modified embodiment of FIGS. 21 and 22 a particular construction of the pawls outer ends and of the seats provided in the body of the gear, is shown. Reference numbers equal to those of the preceding figures are used for like or similar members. Pawls 262 (similar to those indicated by 236) have their outer ends modified, with two inclined surfaces 262A and 262B parallel to each other, and a less inclined surface 262C. Seats 264 (operatively equivalent to those indicated by 242) are correspondingly defined by inclined surfaces having the same inclination as surfaces 262A and 262B and almost the same interspace. In this case, the limiting device operates only in one direction of rotation: In the direction of arrow f201 if the shaft acts as a driving member, and in the opposite direction if the gear is the driving member. The re-engagement takes place at very low speed and in dependence of the inclination of surfaces 262C. In some cases, the device may function also as a freewheel.

FIGS. 23 to 30 show a mechanical drive realization with a unidirectional, that is, freewheel transmission device, that may be held inside a drive box for the transmission, for example, between shafts orthogonal to each other. Numeral 301 indicates one of the two shafts and numeral 303 the other shaft orthogonal to the previous one. Shaft 301 is mounted with bearings 305 and 307, while numeral 309 indicates one of the bearings of shaft 303. On shaft 303, a bevel gear 310 is keyed, which meshes with a bevel gear 312 mounted on shaft 301 to rotate freely thereon, but also to be coupled thereto through the freewheel device to be described. Gear 312 is retained between an annular thickening 301A of shaft 301 and an elastic ring mounted in an annular groove of same shaft. Gear 312 is capable of rotating with respect to shaft 301 but is prevented from performing relative axial displacements. The wider part of the frustoconical body of bevel gear 312 has a cylindrical wall housing 316, which is apt to receive, at least partially, the thickening 301A of shaft 301. In the cylindrical wall perimetrically delimiting said housing 316, seats 318 are formed being shaped with a portion of inclined profile 318A and with an arcuate end portion 318B, the latter having a surface, at least radially disposed, or even with a counterslope in the same direction of the inclination of surface 318A but with an angle (relative to the radial direction) far lower than that of the same surface 318A. Seats 318 are circumferentially distributed in a symmetrical manner, corresponding to the distribution and number of seats 318 and radial cylindrical through seats 320 are formed in the thickening 301A, mostly for a corresponding number of radial pawls 322 able to slide in respective seats 320. The outer end of each pawl 322 has a surface 322A with an inclination corresponding, at least partially, to that of surface 318A in the seats 318 and with a step-like shaping which matches, at least partially, the portion 318B of seats 318. The inner end of each pawl 322 has a frustoconical shaping 322C and an inclined flat 322E. The pawls outer ends 322A, 322B are able to cooperate with the side surface of the housing 316 and with the seats 318, while the pawls inner ends 322C project within an axial cavity 324 which is formed in the shaft 301 starting from the right end thereof (looking at the drawing). Inside the cavity 324 a core 326 is housed that is capable of sliding within same cavity and is urged towards the left side (looking at the drawing) by a spring 328, which operates a compression between the core 326 and a disc 330 mounted at the end of shaft 301 with a retaining means such as an elastic ring or the like. Core 326 has a cylindrical portion for the guided sliding and a frustoconical portion 326A, whose inclination substantially corresponds to the inclination of the flats 322E of pawls 322 which, therefore, are resting on the frustoconical surface of portion 326A, each one along one line.

The disposition is such that the spring 328 urges the core 326 in such a direction as to urge, in turn, the pawls 322 in centrifugal direction against the perimetral wall of cavity 316, in such a way that the pawls are pushed within the seats 318. As a consequence, the shaft 301, being considered the driving member, is able to transmit the motion to gear 312 according to arrow f301, while a reverse displacement of shaft 301 does not transmit the motion to gear 312. In addition, a movement of gear 312 according to arrow f301, relative to shaft 301, is not followed by a corresponding movement of same shaft 301. This is due to the fact that the pawl shapings 322B engage the shapings 318B of seats 318 in the relative direction of rotation, according to f301, of shaft 301 with respect to gear 312 which is thus driven into motion. A reverse relative movement of shaft 301 with respect to the gear is not transmitted since pawls 322 are urged in centripetal direction by the inclined surfaces 318A which act on the pawl profiles 322A by centripetally urging them against surface 326A and determining a sliding of core 326 in a direction opposite to the one according to which it is urged by spring 328. Substantially, spring 328 tends to urge the pawls into engagement and thus to cause the coupling for a drive according to f301 of gear 312 through shaft 301, respectively for a drive of shaft 301 through gear 312 in a direction opposite to arrow f301. When a reverse relative movement occurs, with respect to those indicated, said pawls 322 tend to be urged in centripetal direction against surface 326A and cause the elastic yielding of core 326 in the axial direction against the action of springs 328, in order to allow the pawl skipping with respect to the seats 318.

The described freewheel device is efficiently lubricated within a box containing gears 310, 312 dipped in oil bath, by providing a circulation system which includes a hole or a set of holes 334 in the body of gear 312 in correspondence of the slot between adjacent teeth. To said hole(s) 334, a manifold 336 and one or several holes 338 leading to the cavity 324 correspond on shaft 301 to ensure both the lubrication of the core which must slide within the axial cavity 324 and of the pawls 322 which have to slide with respect to the surface 326A of core 326, and of the seats 320 provided for these pawls.

FIGS. 31 to 38 show a drive device operating like a flexible coupling or spring drive to allow limited relative angular movements of elastic type between the transmission members. Numerals 401 and 403 indicate the two shafts between which a drive comprising said flexible coupling is interposed, the two shafts being orthogonal to each other. Numerals 405 and 407 indicate the bearings for the support of shaft 401, while numeral 409 indicates one of the bearings of shaft 403. The transmission is operated through two bevel gears 410 and 412, mounted on shaft 401 and shaft 403 respectively. Gear 412 is keyed on said shaft 403, while gear 410 is combined to the shaft 401 through the flexible coupling device to be described. The drive with the flexible coupling may be housed in a drive box from which the two shafts 401 and 403 project, the drive box being of oil bath type.

Shaft 401 exhibits a deep axial cavity 414, which starts from the right end (looking at the drawing) of said shaft. Shaft 401 has also an annular thickening 401A, in correspondence of which radial seats 416 are formed for as many sliding pawls 418. Each pawl 418 has the outer end 418A shaped with inclined surfaces. The inner end of each pawl 418 has an inclined surface 418B and a portion of surface 418C of zero inclination, that is, perpendicular to the pawl axis. Inside cavity 414 a core 420 slides with a cylindrical part for the guided sliding thereof inside said cavity 414 and with a plurality of flat surfaces 420A which are inclined according to the same inclination as surfaces 418B. The angle of inclination of surfaces 420A with respect to the core and the axis of shaft 401 is significantly greater than the angle of friction relative to the surface 418B of each pawl 418 and to the corresponding surface 420A of core 420, under the lubrication conditions to which the same surfaces are subjected. Core 420 ends with stretches of surface 420B having zero inclination with respect to the axis of shaft 401 and of core 420 in the portion of said core having smaller cross-section. Core 420 is urged according to arrow f420 by a spring assembly 422 and 424 which react between said core 420 and a disc 426 mounted inside cavity 414 in the vicinity of the end axial opening of said cavity 414. The arrangement of pawls 418 and flats 420B of core 420 is symmetrical with respect to the axis of shaft 401.

The bevel gear 410 has, in the wider part of its frustoconical body, a circular housing 430 partially receiving the thickening 401A of shaft 401. The housing 430 has a cylindrical perimetral wall in which seats 432 are formed having a profile corresponding to that of the outer ends 418A of pawls 418. The number and disposition of seats 432 correspond to those of the pawls. The seats 432 and the outer ends of pawls 418A have their surfaces correspondingly inclined and jointed. Said surfaces are relatively long. The gear 410 is fitted on shaft 401 and is slidingly engaged thereto between the thickening 401A and an elastic retaining ring 434, mounted in a groove provided in said shaft. In this way gear 410 is free to rotate relative to shaft 401 but is engaged through the pawls in the manner described below. The seats 432 and the outer ends 418A of pawls 418 may have the surfaces inclined in a symmetrical way (as in the drawing) or in asymmetrical way, in order to have the same behaviour in the two directions of rotation, or different behaviours in one direction and in the opposite direction of rotation. It is even possible to have only one of the surfaces inclined.

Since the gears 410 and 412 are dipped in an oil bath, the lubrication of members inside the cavity 414 and in particular of pawls 418 and core 420, is achieved by providing one or more radial holes 436 within the cavity between adjacent teeth of gear 410, which holes lead into an annular manifold 437 bored in the outer surface of shaft 401 in correspondence of said holes 436 and in correspondence also of one or more radial holes 438 bored in the shaft 401 between said manifold and cavity 414. In this way, during the gear rotation, the lubricant may be pushed into the cavity 414 to lubricate the surfaces in relative motion to each other.

For the transmission of motion, the axial elastic thrust exerted by the suitably calibrated springs 422, 424 on core 420, causes a radial centrifugal thrust on all the pawls 418 because of the interaction between surfaces 420A and surfaces 418B. The outer ends of pawls 418 are housed inside the seats 432 in the cylindrical perimetral wall of housing 430 formed in the body of gear 410. During the transmission of motion, the transmitted torque generates, on the outer end 418A of pawls 418, a centripetal thrust on same pawls 418 and thus a pressure of surfaces 418B onto the inclined surfaces 420A of core 420, thereby determining an axial thrust on core 420 opposite to that exerted by springs 422 and 424. To each value of the transmitted torque there is a corresponding value of said thrust exerted by pawls 418 on core 420, and thus there is a precise balance position of said core 420 resulting from the action of radial pawls 418 and from the thrust of the reaction springs 422, 424. An increase of the transmitted torque gives rise to a displacement of the central core 420 with a further compression of springs 422 and 424 and the opposite occurs, with a decrease of said transmission torque.

When, during the transmission an impulse torque, i.e. a sharp increase in the transmitted torque takes place because of whatever external phenomenon, this impulse torque is damped by the described device owing to the transformation of kinetic energy (due to the impulse torque) into potential energy of springs 422, 424 which increase their compression. The calibration of springs 422 and 424 will be predetermined so that no motion of the device members will occur until a desired value of the transmitted torque is reached, which members, instead, become operative the moment the predetermined torque is exceeded. Upon reaching a maximum impulse torque, after the sliding of core 420 in the direction that causes a compression increase of springs 422, 424 because of the interaction between the surfaces 418B and 420A the displacement of core 420 due to the springs yielding reaches such a value that the surfaces 418C and 420B having zero inclination come into contact with one another. In this condition, no further axial displacement of the core can occur and the transmission is again assured but in a rigid way as the elastic yielding of the described flexible coupling has now reached the end of run, while the pawls 418 maintain their engagement into seats 432 and thus the transmission condition. When the impulse torque is reduced, the prevailing thrust of springs 422, 424 causes again the sliding of core 420 in such a direction as to determine again a centrifugal displacement of pawls 418 which come back to their normal position of maximum penetration of their ends 418A into the respective seats 432.

Throughout the device operative range, pawls 418 remain always engaged in their seats 432, thus ensuring the motion transmission, but come into contact with more or less extended zones of the inclined surfaces of the respective seats 432, anyway over extents being mechanically sufficient to transmit the torque.

The calibration of springs 422 and 424 may be obtained by replacing springs and also by providing suitable shims between springs and disc 426. Disc 426 has also a sealing function for retaining the lubricant within cavity 414.

FIGS. 31 and 32 show the normal transmission condition of the described flexible coupling, while FIGS. 37 and 38 show the condition of the flexible coupling upon reaching the maximum elastic deformation of the springs and thus with the maximum angular elastic yielding in the motion transmission between the two shafts 401 and 403.

FIGS. 39 to 46 show a clutch device provided inside a drive for the transmission between two shafts 501 and 503 at right angles to one another, and between which a motion transmission is provided by two bevel gears 505 and 507, the gear 507 being keyed on shaft 503 and the gear 505 being idly mounted on shaft 501 and able to be connected to and disconnected from same shaft 501 through the clutch device to be described. Numerals 509 and 510 indicate two bearings for shaft 501, and numeral 512 indicates one of the bearings for shaft 503. By means of these bearings, the shafts 501 and 503 are supported in a drive box from which same shafts project. The drive box may be of oil bath type like the clutch device to be described.

Shaft 501 exhibits a deep axial cavity 520, stemming from its right end, looking at the drawing. The shaft 501 has also an outer annular thickening 501A in correspondence of which radial seats 522 are partially dug, said seats extending between cavity 520 and the outside, and slidingly receiving a corresponding number of pawls 524. Both seats 522 and pawls 524 have rectangular cross-section, particularly a square cross-section. Each pawl 524 is provided with an outer flat, inclined surface 524A to cause a strong axial thrust with a displacement of pawl within the seat 522 provided for same pawl. At its outer end each pawl has an inclined surface 524B, whose inclination to the axis of shaft 501 is remarkably greater than the angle of friction occurring between the surface 524B and the cooperating surfaces 526A of a core 526, that is axially sliding within cavity 520. In the illustrated example, core 526 has four flat surfaces 526A inclined to the axis of the shaft with the same inclinations of the pawls inner ends 524B, and also pawls 524 are in number of four, regularly distributed around the shaft axis.

In the wider part of its frustoconical body, gear 505 is provided with a wide frustoconical cavity 505A, in which a clutch, i.e. a friction cone 530 may be housed cooperating therewith, said cone being capable of short axial slidings with respect to gear 505 whose axial position is delimited in the manner to be described below. The clutch cone 530 has a plurality of radial seats in the form of channels corresponding to the number of pawls and partially accommodating said pawls. Seats 532 have a rectangular cross-section and the bottom inclined in correspondence of the inclination of the surfaces 524A of pawls 524. A torque is easily transmitted between the shaft 501 and the clutch cone 530 thanks to the rectangular and especially square shape of the cross-section of pawls 524 and the corresponding shape of seats 522 of shaft 501 and of seats 532 of clutch cone 530. Gear 505, which is free to rotate with respect to shaft 501, is engaged to the same shaft in axial direction through a system of shoulders which comprise, in particular, a thrust bearing. More particularly, gear 505 is retained between the clutch cone 530 and a spacer 538 which rests on a thrust bearing 540. The position of said bearing 540 is suitably adjusted through a threaded ring 542 which engages in a threading of shaft 501. The axial thrust of the clutch cone 530 upon gear 505, exerted in the manner indicated below, is then discharged through the thrust bearing 540. A self-locking elastic ring 536, mounted in a groove of shaft 501, is intended to facilitate the adjustment of bearing 540 by the screw ring 402, so as to ensure the proper portion of gear 505 with respect to gear 507.

The lubrication of cavity 505A and of the clutch cone is ensured through one or more holes 544 extending between cavity 505A and the slot between adjacent teeth of gear 505.

As already mentioned, the shape of pawls 524 and of seats 532 as well as of seats 522 is squared, so that an optimal driving capacity of the clutch cone is obtained by the shaft 501 through the pawls, or vice versa, by the clutch cone to the shaft. The inclination with respect to shaft 501, according to which the surfaces 526A of core 526 and the surfaces 524B of pawls 524 are made to coact, is significantly greater than the angle of friction relative to the contacting materials and to the lubrication conditions of these surfaces. The central core 526 is elastically urged according to arrow f526 in axial direction by elastic means to be described, and therefore it exerts a centrifugal component on the foot 524B of the pawls according to the axis thereof in a radial direction, which tends to displace same pawls outwardly. This component, owing to the inclined plane 524A of the pawls and to the inclined surface of the bottom of seats 532 of the clutch cone 530, causes a strong axial thrust of the clutch cone 530 towards the conical wall of cavity 505A formed in the gear 505. This thrust is relevant to obtain the transmission of the friction torque and thus of the clutch-operated torque between members 530 and 505.

The axial thrust on the central core 526 is determined by a pack of cup-shaped springs 550, which are housed in the cavity 520 and which abut on one side on core 526 and on the other on a threaded sleeve 552 which is engaged with and axially adjustable on an inner threading 520A of cavity 520. The springs 550 of the pack of cup-shaped springs are of a type peculiarly capable of maintaining a substantially constant thrust in a definite deflection field and as long as they work within a range of predetermined minimum and maximum heights. The calibration is achieved through the axial adjustment of sleeve 552 by means of threadings. The sleeve 552 has an axial handling appendix 552A extending outside shaft 501, and a suitable seal gasket 556 operates between the end of shaft 501 (that is, the end of cavity 520) and said extension 552A of sleeve 552 for the seal of the lubricant. With the use of these cup-shaped springs, of the special type above mentioned, it is possible to ensure the operating capacity of the clutch, according to the calibration values, for a certain degree of wear of the clutch cone 530 and of the conical clutch surface 505A of gear 505. It is thus possible to maintain steady within certain limits the characteristics of the clutch coupling in question.

When the wear of the friction surfaces exceeds the boundaries of the operating range of springs 550, the sleeve 552 is adjusted to restore the working and calibration conditions.

The wear conditions of the friction surfaces of the clutch cone 530 and of its surface 505A may be made evident by the presence of a stick 558 engaged to the core 526 and extending into an axial through hole of sleeve 552 and of its extension 552A to project therefrom and be visible. When the projecting portion of stick 558 tends to become shorter or when the stick does not project at all, it is necessary to restore the calibration conditions by acting on sleeve 552 and screwing it until the desired calibration compression of springs 550 is restored. The stick 558 may also be provided with one or more fiducial marks like those of a scale.

The clutch device can be controlled for the disengagement by acting axially on the core against the action of springs 550 to determine the disengagement. It is also conceivable to displace all the assembly made up of core, springs and sleeve, between an engagement position and a disengagement position.

The inclinations of the cooperating surfaces allow to dispose of a strong thrust of the clutch cone 530, even with a very limited push on the core 526 in axial direction.

In the modified embodiment of FIGS. 47 to 50 (wherein like members are indicated by the same references used in the preceding figures) the sleeve 552 has an extension 552B similar to that 552A, but making up a support for a cylinder 570 of a fluid-operated system whose piston 572 is solid with a stem 568 which (like the one indicated by 558) goes through the sleeve 552 and its extension 552B and is engaged to the core 526. This stem 568 (instead of having signalling function similarly to stem 558) is intended to drive the core 526 through the cylinder-piston system 570, 572 against the action of springs 550 in order to disengage the clutch cone 530 from its seat within gear 505.

The assembly of each of the above described devices is capable of being received into a very limited space and thus contained even in a drive box from which two shafts project and whose dimensions correspond in practice to those of a drive box comprising only the bevel gears like those indicated by 505, 507.

Figure 51:
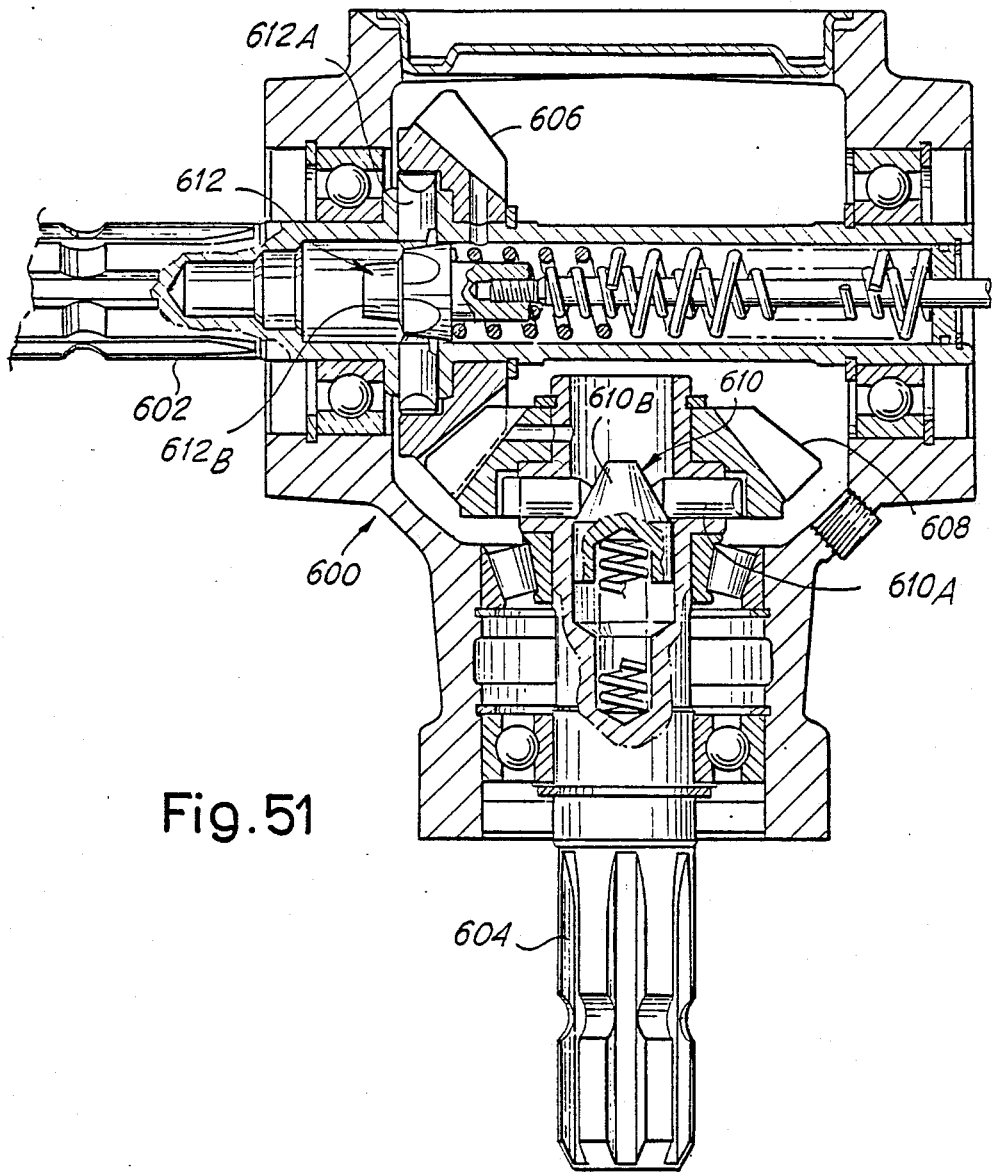
FIG. 51 shows a drive box in which two different devices, of the type illustrated in some of the previous figures, are housed.

In a single box two devices may actually be received on the two shafts reaching the same box. FIG. 51 shows a drive box 600 wherein two shafts 602 and 604 disposed at right angles penetrate. On each of the two shafts, a bevel gear is mounted, respectively indicated by 606 and 608, the two gears cooperating with one another. Between shaft 604 and gear 608 a device generally indicated by 610 is provided, having pawls 610A and core 610B of one of the two types previously described. Between shaft 602 and gear 606, another device is provided, generally indicated by 612, with pawls 612A and core 612B of another of the types previously described. The device 612 may have a manoeuvering or control rod 614.

It is understood that the drawing shows examples given only as demostrations of the invention, as this may vary in forms and dispositions without nevertheless departing from the scope of the idea on which the invention is based. The possible presence of reference numbers in the attached claims has the purpose of facilitating the reading of the claims, reference being made to the description and drawing, and does not limit the scope of the protection defined by the claims.

I claim:

1. A mechanical drive box comprising at least a shaft and at least a drive member on the shaft, and a device for the transmission of motion between the shaft and the drive member, said device for the transmission of motion between said shaft and the drive member mounted thereon including: a set of pawls radially movable within seats formed in the shaft to ensure the guiding of the pawls, said pawls having inner and outer ends shaped in one of a radial and axial direction; said drive member having a shaped surface for cooperating with the outer ends of said pawls; an axial cavity defined inside said shaft for receiving an axially movable shaped core, said shaped core being connected with elastic means biasing said core into engagement with said pawls, said core having shaped inclined surfaces able to cooperate with the inner shaped ends of the pawls; the axial position of said core, and/or the force of the elastic means acting on the core and/or the pawls resistance against centripetal displacement determining the radial position of said pawls, wherein within said drive member a housing is formed, said housing defining said seats, perimetraly formed to cooperate with the shaped outer ends of the pawls, at least a second shaft with at least a gear member connected to said drive member, said drive member including a bevel gear and said housing being formed in a larger part of the body of said bevel gear, radial passages being provided between the drive member bevel teeth running as far as the axial cavity of the shaft, a manifold being provided in the cooperating surfaces of said drive member and said shaft.

2. Mechanical drive box according to claim 1, wherein the elastic means are held within the cavity and are made to rest on a retaining and support disc; said disc including seal means for the retention of the lubricating oil.

3. Mechanical drive box according to claim 1, with two shafts-an input and an output shaft-on which gears are provided, wherein in the body of each of these gears a different device with relevant pawls and with relevant core is housed.

4. Mechanical drive box according to claim 2, wherein: said device is an engagement and disengagement device; the pawls have the outer ends shaped with inclination corresponding to seats in the housing and the inner ends developed with two differently inclined surfaces; the central core has both surfaces inclined in correspondence of the pawl surfaces having less inclination with respect to the shaft axis, and far more inclined surfaces in correspondence of the more inclined pawl surfaces along an annular groove of same core on the side of the smallest cross-section of the zone of the surfaces having less inclination; spring means are provided acting axially on core and reacting on the shaft; and an axial control rod is provided to act on the core against the action of the spring means.

5. Mechanical drive box according to claim 4, wherein said minor inclination has nearly the value of the angle of friction occurring between the cooperating lubricated surfaces of the core and of each pawl.

6. Mechanical drive box according to claim 5, wherein: the spring means act on core to cause the centrifugal sliding of the pawls with interaction between surfaces of greater inclination and thereby to determine the engagement and the retention of the engaged condition; and the control rod is so developed as to make the core slide against the action of spring means and to cause the disengagement through a displacement of the pawls along the less inclined surfaces and thus in centripetal direction, owing to the reaction of the transmitted torque, as far as the inside of said groove.

7. Mechanical drive box according to claim 5, wherein: the spring means act on the core to urge it into disengagement through a displacement until said annular groove of the core is brought in correspondence of the pawls; and said rod is axially operated through rolling bearing means for determining-against the action of spring means-the engagement with radial centrifugal displacement of the pawls.

8. Mechanical drive box according to claim 2, wherein: said pawls have outer ends shaped as inclined surfaces cooperating with surfaces of the seats to cause a centripetal thrust on said pawls of a value proportional to the transmitted torque; said pawls have the inner ends shaped with two inclinations each having an angle greater than the angle of friction occurring between the cooperating surfaces of the core; the core having flat surfaces each with two inclinations corresponding to those of the inner ends of the pawls; the elastic means are calibrated and push the core axially to make the surfaces having less inclination cooperate in a condition of balance between the action of the transmitted torque and the thrust of the elastic means onto the pawls; an axial displacement of the core due to the yielding of the spring means causing the contact between the more inclined surfaces of core and of pawls, with a fast centripetal run of the pawls and consequent disengagement.

9. Mechanical drive box according to claim 12, wherein the greater inclination of surfaces of the core and of the inner ends of the pawls is such as to allow the automatic reengagement, owing to the axial thrust of the elastic means onto the core, only upon slow running.

10. Mechanical drive box according to claim 9, wherein the shaping of one of the core and the inner ends of the pawls has a "Z" profile, with a support able to prevent angular displacements of the core.

11. Mechanical drive box according to claim 10, wherein the core has: a first enlarged part with surfaces having a lower inclination; in correspondence of the end having smaller cross-section of said first part, an annular step shaping with the surfaces having greater inclination; and beyond said step shaping an extension for the support of the pawls inner ends, to prevent angular displacements of the core.

12. Mechanical drive box according to claim 11, wherein the outer ends of the pawls and the seats for the pawls are shaped with symmetrical inclinations.

13. Mechanical drive box according to claim 11, wherein the outer ends of the pawls are shaped with inclined and parallel surfaces and are shaped with a surface having a lower inclination, and correspondingly the seats have inclined and parallel surfaces like those off the pawls.

* * * * *